United States Patent [19]

Hydeman et al.

[11] Patent Number: 5,078,955
[45] Date of Patent: Jan. 7, 1992

[54] CONTROL ROD GUIDE TUBE INSPECTION SYSTEM

[75] Inventors: Jeffrey E. Hydeman, Murrysville; Edward H. Smith, Brave, both of Pa.

[73] Assignee: Westinghouse Electric Corp., Pittsburgh, Pa.

[21] Appl. No.: 366,174

[22] Filed: Jun. 14, 1989

[51] Int. Cl.$^5$ ............................................. G21C 17/00
[52] U.S. Cl. ..................................... 376/248; 376/258
[58] Field of Search ............... 376/245, 249, 248, 258, 376/252; 73/623, 601, 865.8; 356/241; 165/11.2, 76

[56] References Cited

U.S. PATENT DOCUMENTS

| 3,063,290 | 11/1962 | Kaserman | 376/252 |
| 3,077,361 | 2/1963 | Tait et al. | 376/262 |
| 3,237,150 | 2/1966 | Beck | 367/107 |
| 4,255,762 | 3/1981 | Takeyasu et al. | 376/248 |
| 4,424,531 | 1/1984 | Elter et al. | 358/100 |
| 4,650,634 | 3/1987 | Meuschke et al. | 376/248 |
| 4,689,994 | 9/1987 | Savinell et al. | 73/634 |
| 4,725,883 | 2/1988 | Clark, Jr. et al. | 358/100 |

FOREIGN PATENT DOCUMENTS 208884  4/1984  German Democratic Rep. .

Primary Examiner—Brooks H. Hunt
Assistant Examiner—Meena Chelliah

[57] ABSTRACT

A control road guide tube inspection system is provided which consists of a camera delivery tool which is lowered through the 2.3 inch diameter opening in the guide plates of the tube to position a camera over a selected hole in the guide plate to be inspected. The camera is an underwater CCTV camera, and the system further includes an image enhancement system which uses the video output from the camera to obtain quantitative data on the wear of the guide plates. An ultrasonic gauge to measure the distance from the camera to the guide plate being inspected is also provided on the delivery tool. Once the delivery tool is inserted into the central opening of the guide tube, two mechanisms are used to position the camera over the guide plate holes, including a foot element which is pivoted out of the confines of the housing tube, allowing the delivery tool to rest on the guide plate which is immediately below the guide plate to be inspected by the camera and a straight line motion linkage which moves the camera sideways out of the confines of the housing tube enabling the camera to look straight down at the holes formed in the guide plate. Because the guide plates are evenly spaced in the guide tube, by resting the delivery tool on the guide plate below the one to be inspected, the camera will be positioned a known fixed distance from the guide plate to be inspected.

34 Claims, 4 Drawing Sheets

CONTROL ROD GUIDE TUBE INSPECTION SYSTEM

BACKGROUND OF THE INVENTION

The present invention relates to the inspection of guide plates within the control rod guide tubes of nuclear reactors and more particularly to a delivery tool for positioning a CCTV camera above one of a plurality of holes in a respective guide plate to be inspected.

The core of a modern nuclear reactor of the type used to generate electrical power generally includes an upper internals assembly disposed over a lower core barrel. The lower core barrel houses an array of fuel rod assemblies which generate heat as a result of a controlled fission reaction that occurs in the uranium oxide pellets present in their individual fuel rods. Water is constantly circulated from the lower core barrel through the upper internals and out through outlet nozzles provided in the walls of an upper core barrel in order to transfer the heat generated by the fuel rod assemblies to heat exchangers which ultimately convert this heat into usable, nonradioactive steam.

The rate of the fission reaction taking place within the fuel rod assemblies is regulated by means of a control rod assembly. Each of these control rod assemblies is formed from an array of stainless steel tubes each containing a neutron absorbing substance such as silver, indium or cadmium. These stainless steel tubes (known as "rodlets" in the art) are suspended from a spider-like bracket. A reciprocable drive rod is connected to the spider-like bracket for either inserting or withdrawing the rodlets of the control rod assembly deeper into or farther out of each of the fuel rod assemblies in order to modulate the amount of heat generated thereby.

The upper internals assembly includes an upper core barrel arranged in tandem with the lower core barrel of the reactor. The ceiling of the upper core barrel is formed from an upper support plate. The peripheral edge of this support plate is seated around the upper edge of the upper core barrel. Both the support plate and the upper core plate which underlies it include a plurality of apertures for both conducting the stream of hot, pressurized water exiting the fuel rod assemblies to the heat exchangers, as well as for conducting a control rod assembly either into or out of each of the fuel rod assemblies. Separate guide tubes are provided between apertures in both the support and core barrel plates which are aligned with each other and with one of the fuel assemblies in the lower core barrel. The purpose of these guide tubes is to align and guide the relatively long and flexible rodlets of the control rod assemblies into a particular fuel assembly. Additionally, separate support columns are connected between the upper support plate and the underlying upper core plate in order to suspend and support the upper core plate over the fuel rod assemblies contained within the lower core barrel.

Applicants have observed that the control rods used in some nuclear reactors are manifesting noticeable mechanical degradation in the form of wear, which in some cases occurs after only a few fuel cycles. The applicants have further observed that this degradation is caused by stepping and fretting wear between the control rods and the guide plates which guide the individual control rods into the reactor core.

Each guide tube encloses a number of guide plates which are perpendicularly positioned with respect to the longitudinal axis of the guide tube. Each of the guide plates have an array of through holes approximately 0.42" (1.07 cm) in diameter formed therein which receive the reciprocably movable control rods to guide them into and out of the reactor core. These guide plates are uniformly spaced along the axis of the guide tube and are 10.57 inches (26.85 cm) apart in the upper portion of the guide tube and 11.57 inches (29.39 cm) apart in the lower portion thereof. Further, each guide plate include a central bore 2.3 inches (5.84 cm) in diameter which presents the only access to the individual guide plates. There can be up to twelve guide plates in a given guide tube, with each guide plate containing up to twenty-four holes.

Because of the premature wearing of the control rods in some instances, it has become desirable to obtain wear characteristics of the holes of each individual guide plate so that this data may be correlated with the control rod wear scars. This would enable a model of the wear mechanism to be developed by maintenance technicians in order to solve the wear problem associated with the control rods and guide plates. Consequently, there is a pressing need for an inspection system for inspecting each of the individual holes in the guide plates and transforming this data into a usable form.

Devices known at this time for inspecting the interior of various tubular members are directed toward inspecting the inner wall of such members and not the inspection of plates enclosed within such tubular members. Examples of such inspection assemblies are set forth in U.S. Pat. No. 4,255,762 to Takeyasu et al. and U.S. Pat. No. 4,424,531 to Elter et al. Each of these assemblies employs a camera for transmitting images of the wall of the inspected tube to an outside control center, and may include sensors for determining the relative positioning of the assembly within the tube. However, it is not possible for these assemblies to inspect holes in the surface of a diametrically positioned plate within tube.

Similarly, the remote inspection assembly disclosed in German Democratic Republic (East German) Patent No. 208,884 is capable of inspecting the interior of nuclear reactor pressure vessels. While this assembly includes a monitor and TV camera for recording images, it is not capable of inspecting holes in the surface of transversely positioned plates within an elongated tube.

SUMMARY OF THE INVENTION

Generally speaking, the present invention is an inspection system for inspecting the wear of guide plates positioned within the interior of a control rod guide tube. Moreover, the present invention provides an inspection system wherein the results of the inspection of these guide plates when correlated with the data received from the eddy current testing of the control rods will make possible the development of a model of wear associated with the movement the control rods within the guide tubes. This correlation and model will provide a better understanding of the wear of the guide plates and control rods and the associated problem.

The control rod guide tube inspection system according to a preferred embodiment consists of a camera delivery tool which is lowered through the 2.3 inch (5.84 cm) diameter opening in the guide plates of the guide tube and positions the camera over a hole to be inspected. The camera is an underwater CCTV camera, and the system further includes an image enhancement system which uses the video output from the camera to obtain quantitative data on the wear of the guide plates. An ultrasonic gauge to measure the distance from the camera to the guide plate being inspected is also provided on the delivery tool.

The camera delivery tool enables the operator to remotely inspect guide tubes underwater at depths of 30–40 feet (9.14–12.19 m). The lower 15-foot (4.572 m) section of the delivery tool is enclosed within a 2.25 inch (5.715 cm) outside diameter housing tube, which enables it to be inserted fully into the guide tube, whether the guide tube is in the upper internals assembly of the nuclear reactor or in a guide tube storage stand.

Once the delivery tool is inserted into the central bore of the guide tube, two mechanisms are used to position the camera over the guide plate holes. The first mechanism includes of a foot element which is pivoted out of the confines of the housing tube, allowing the delivery tool to be rested on the guide plate which is immediately below the guide plate to be inspected by the camera. The second mechanism is formed from a straight line motion linkage which moves the camera sideways out of the confines of the housing tube enabling the camera to look straight down at the holes formed in the guide plate. As mentioned previously, the guide plates are evenly spaced in the upper portion of the guide tube and are 10.57 inches (26.85 cm) apart in the upper portion of the guide tube and 11.57 inches (29.39 cm) apart in the lower portion of the guide tube. By resting the delivery tool on the guide plate below the one to be inspected, the camera will be positioned a fixed distance from the guide plate to be inspected.

The camera is a standard underwater CCTV camera which provides a video signal to the image enhancement system. The image enhancement system may be an add-on to a personal computer which digitizes the video signal and provides various features which may be used to enhance the image and obtain qualitative measurements of the guide plate holes. To further assure the proper characterization of the obtained data, a standard ultrasonic thickness gauge is mounted to the face of the camera and is used to measure the distance from the camera to the guide plate under observation. This allows the image enhancement system operator to introduce a correction scale factor based on the variation of the distance from a predetermined value.

Before the delivery tool is inserted into the guide tube, the ultrasonic thickness gauge is calibrated to a known distance, and the camera is focused on a hole of known diameter. This is performed using a single calibration standard. The image enhancement system is also calibrated to the known diameter. The delivery tool is then inserted into the guide tube until a mark on the outside of the tool lines up with the top of the guide tube. Once in this position, the foot is extended from its housing by actuating a single-acting hydraulic cylinder whose rod is connected to a rack and pinion assembly. The gear racks mesh with a pair of spur gears which are mounted to the foot. When the gear rack assembly is moved upward by the hydraulic cylinder, the foot pivots about a pin through its center and pivots out to a position perpendicular to the tool centerline. The delivery tool is then lowered such that the foot rests on the guide plate below the guide plate to be inspected, thereby supporting the entire delivery tool. This foot has two rollers on the bottom which allow the tool to be rotated until the rollers "snap" into slots formed in the guide plate. Because the foot is aligned with the camera, the camera will then be aligned with the slots and thus the holes in the guide plate.

The camera is then extended from its housing by a 24 VDC electric motor which is mounted to the top flange of the tool. The motor rotates a long shaft which extends down through the inside of the tool to the camera housing, where it is attached to a lead screw assembly. As the shaft rotates, the linkages move the camera holder outward from its housing in a straight line.

By manipulating the linkage, the camera may be moved inward and outward, and the delivery tool may further be rotated within the guide tube. This allows virtually all of the guide plate holes to be inspected This procedure may then be repeated for each of the guide plates to be inspected, with the results being correlated with that of the eddy current test data of the control rods to allow for the development of a model representative of the occurrences within the guide tube.

DETAILED DESCRIPTION OF THE PREFERRED EMBODIMENT

Figure 1:
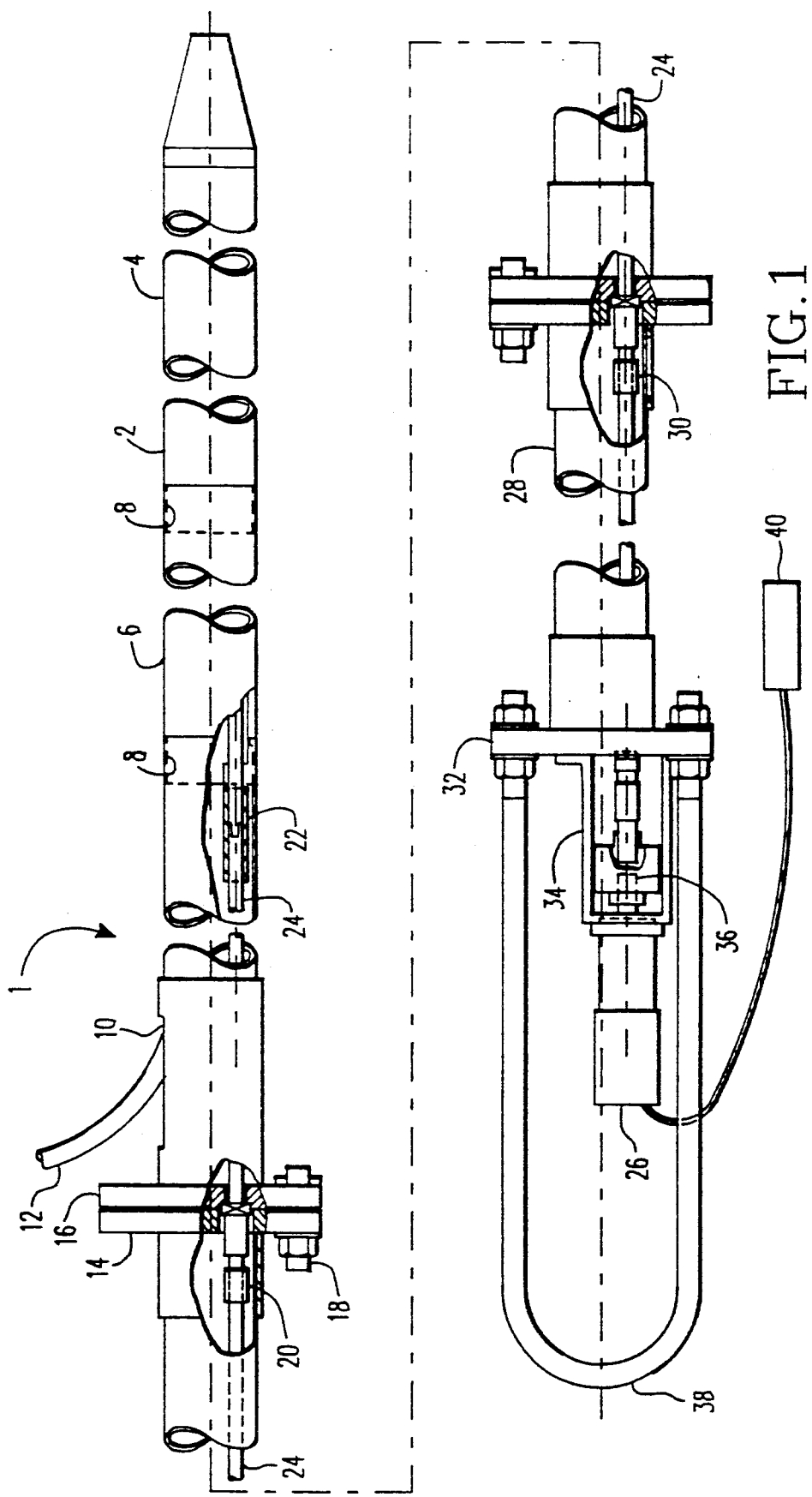
FIG. 1 illustrates the delivery tool of the control rod guide tube inspection system in accordance with a preferred embodiment of the invention.

FIG. 1 of the drawings illustrates the control rod guide tube inspection system in accordance with the preferred embodiment. The control rod guide tube inspection system consists primarily of a delivery tool 1 which contains the various subassemblies for inspecting the through holes formed in the guide plates within the control rod guide tube. The delivery tool 1 consists of a sectional housing tube 2 which may be separated in order to change the effective length of the tool as well as the particular subassemblies therein. As can be seen in FIG. 1 the subassemblies 4 and 6 are connected to the end of the delivery tool 1 by way of telescopic connections 8 such that these assemblies may be readily attached to the end of the delivery tool. The subassemblies 4 and 6 are enclosed by the tubular housing having an outside diameter of 2.25 inches (5.715 cm) which enables the lower portion of the delivery tool to be inserted fully into the guide tube. The delivery tool enables the operator to remotely inspect guide tubes underwater at depths of 30–40 feet (9.14–12.19 m); however, it should be noted that the guide tubes may be inspected in either the upper internals assembly of the nuclear reactor or when the guide tubes are in a storage stand.

The lower portion of the delivery tube which accommodates the subassemblies 4 and 6 extends approximately 15 feet (4.572 m) in length. In an upper portion of this extension is an opening 10 which allows the cable 12 to pass into the delivery tool for supplying electrical power to the subassemblies, and for transmitting the data which is received by the subassembly. This lower extension of the delivery tool 1 is connected to an upper extension of the delivery tool 1 by way of the flange members 14 and 16. These flange members 14 and 16 are fixedly attached to one another by releasable fitting attachments 18. These fitting attachments may consist of a nut and bolt structure as is shown in FIG. 1 or any other releasable securing element. While FIG. 1 shows only one releasable fitting attachment 18 a plurality of such elements would be provided about the periphery of the flange.

As can be further seen in FIG. 1 by fixedly securing flanges 14 and 16 together a rotatable coupling is formed between the lower extension of the delivery tool and upper extension of the delivery tool by way of the coupling 20. This coupling 20 is of a conventional form including a key and slot configuration as well as a sleeve for enclosing the key and slot coupling and thereby form a continuous rotatable shaft 24. Additionally, a key and slot coupling 22 is also provided in the region of the telescopic connection between subassembly 6 and the lower extension of the delivery tool 1. Each of these couplings transmit rotational movement of the shaft 24 which is generated by a motor 26 positioned above the upper extension of the delivery tool 1, to the subassembly 6. This rotational movement will be discussed in greater detail below.

As can be further seen from FIG. 1, an additional upper section 28 of the upper extension is provided This upper section is connected to the lower section 27 of the upper extension in a manner similar to that of the connection between the upper extension and the lower extension of the delivery tool 1. This connection includes a coupling 30 identical to that of the coupling 20 previously described. Any number of these sections may be provided in order to form a delivery tool having a sufficient length for positioning the subassemblies where desired within the control rod guide tubes.

As discussed previously the motor 26 is mounted to an upper flange 32 of an end portion the upper section 28 of the upper extension. A bracket 34 is provided for accommodating the motor 26 as well as a transitional coupling 36. The transitional coupling 36 transfers rotational movement from the electric motor 26 to shaft 24, and is formed from a slip-clutch coupling to prevent excessive force from jamming the camera linkage 58, 60 in the guide tube 80. In order to protect this portion of the assembly and also allow the operator sufficient access to the assembly to enable him to manipulate the device, a U-shaped bar 38 is provided. The U-shaped bar 38 is fixedly secured to the upper flange 32 to allow the operator to maneuver the assembly once the assembly is positioned within the control rod guide tube. This feature will be discussed in detail hereinafter. A drive control 40 is provided which allows the operator to operate the electric motor 26 in either the forward or reverse direction, allowing him complete control over the movement of a camera 43 which is positioned within the camera mount 42 in subassembly 6.

Figure 2:
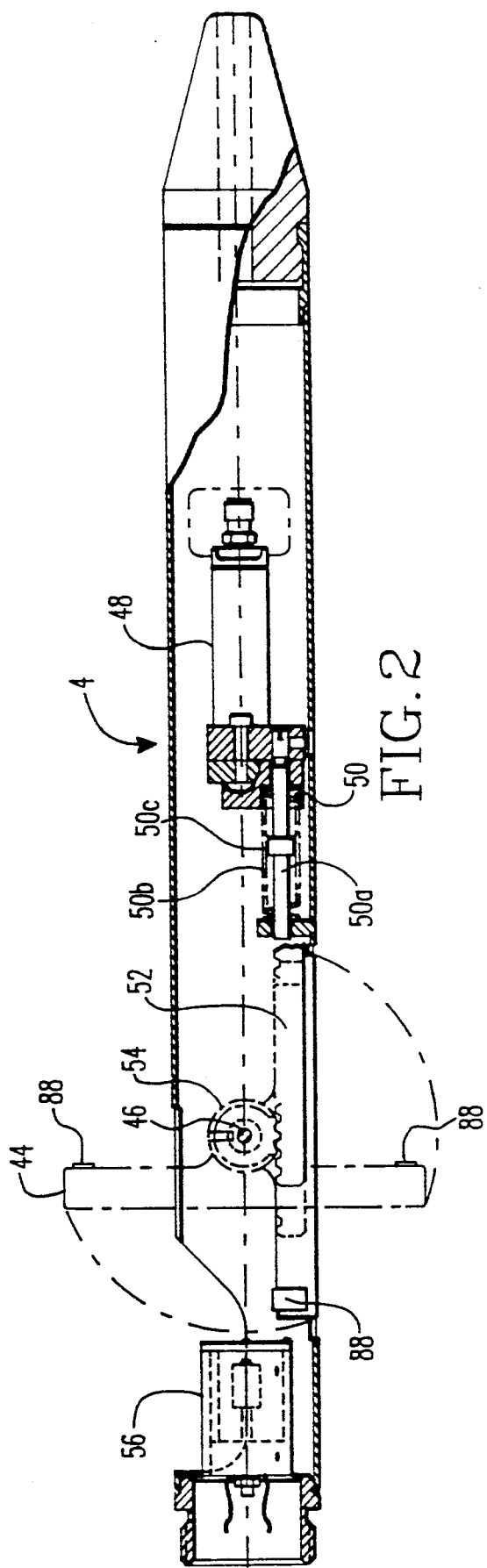
FIG. 2 is a cross-sectional elevation view of the supporting portion of the delivery tool of FIG. 1.

Turning now to FIG. 2, the subassembly 4 will be discussed in greater detail. Subassembly 4 which is telescopically positioned on the lower most portion of the delivery tool 1 includes positioning foot 44 which is provided to accurately position the delivery tool within the control rod guide tube. As is illustrated in FIG. 2, the positioning foot 44 is pivotally mounted within the subassembly 4 about an axis 46. During positioning of the delivery tool within the control road guide tube, the positioning foot 44 is in the retracted position, i.e., that position shown by the solid lines in FIG. 2. Once the delivery tool has reached its approximate position within the control rod guide tube, the hydraulic cylinder 48 is actuated which displaces the plate 50 and consequently the rack 52 which when coupled with the pinion 54 connected to the positioning foot 44 will pivot the foot 44 about the axis 46 to the position shown in the phantom lines in FIG. 2. In order to accurately orient the foot 44 perpendicular with respect to the subassembly 4, a rod 50a that remains stationary relative to the subassembly 4 is provided which includes a stop 50c that contacts the displaced plate 50. The stop 50c is prepositioned so as to allow sufficient displacement of plate 50 and subsequently the complete pivotal movement of foot 44. Once this position is reached the delivery tool may rest atop the guide plate 84c which is below guide plate 84b to be inspected. This will be discussed in further detail with respect to FIG. 4. It should be noted that the rack 52 and pinion 54 may be of a dual type to provide greater stability and reliability. The rod 50a further acts as a guide for the concentric coil spring 50b which upon retraction of the hydraulic cylinder 48, positively displaces plate 50 to its original position which additionally retracts the foot 4 into the subassembly 4.

Also positioned within the subassembly 4 is a light source 56 which is provided for illuminating the space within the control rod guide tube between guide plate 84c on which the positioning foot 44 is resting and guide plate to 84b be inspected. This will provide sufficient illumination of the guide plate to be inspected to allow the camera to effectively view the through holes formed in the guide plate.

Figure 3:
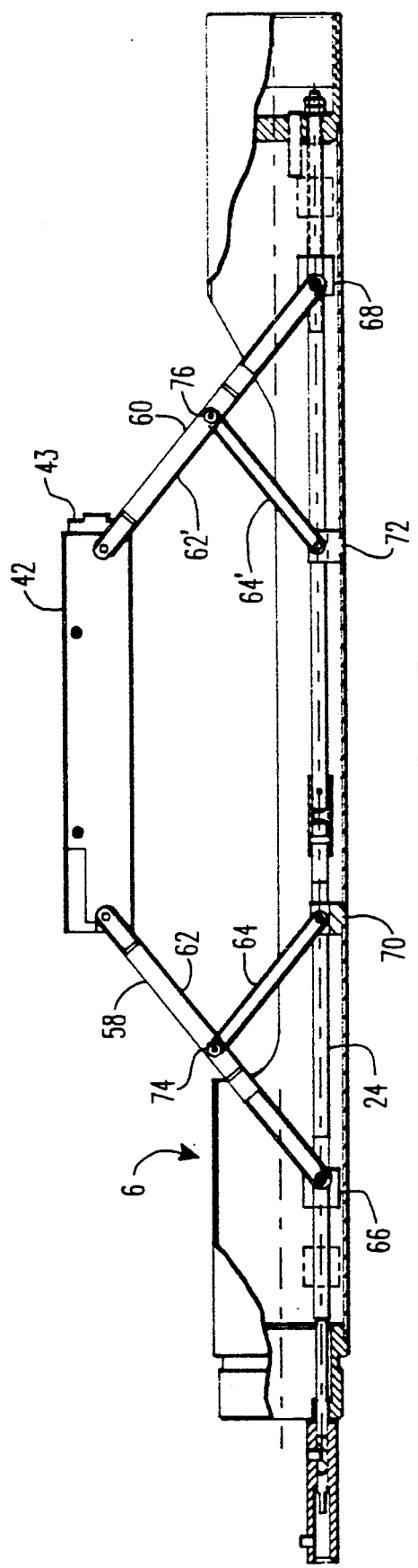
FIG. 3 is a cross-sectional elevation view of the camera manipulation portion of the delivery tool of FIG. 1.

Subassembly 6 is illustrated in greater detail in FIG. 3. The subassembly 6 accommodates the camera 43 which is mounted in camera mount 42 so as to be laterally displaced from the subassembly 6 in order to view the through holes formed in the guide plate. During the insertion of the delivery tool, it is that the camera 43 be positioned within the housing 2 to allow the delivery tool 1 to be inserted within the 2.3 inch diameter central opening of the control rod guide tube. Once the delivery tool 1 is positioned within control rod guide tube 80, the camera 43 and camera mount 42 will be laterally extended from the subassembly 6. This is accomplished by straight line motion linkages 58 and 60, each of these motion linkages being mounted to the rotatable shaft 24 by way of lead screw assemblies. Each of the linkages 58 and 60 consist of a movable member 62 and 62' and a pivotable member 64 and 64'. The movable member 62 is attached to a left hand threaded nut 66 while the movable member 62' is pivotally connected to a right hand threaded nut 68 so that rotation of the transmittal shaft 24 will cause the nuts 66 and 68 to move towards and away from one another. Each of the pivotal linkages 64 and 64' are pivotally mounted to stationary members 70 and 72 such that during the movement of element 62 and 62' these arms will pivot about the stationary mounts 70 and 72 as well as the pivotal connections 74 and 76 to maintain a linear path for the camera 43 and the camera mount 42 outwardly and inwardly from the tubular housing.

Figure 4:
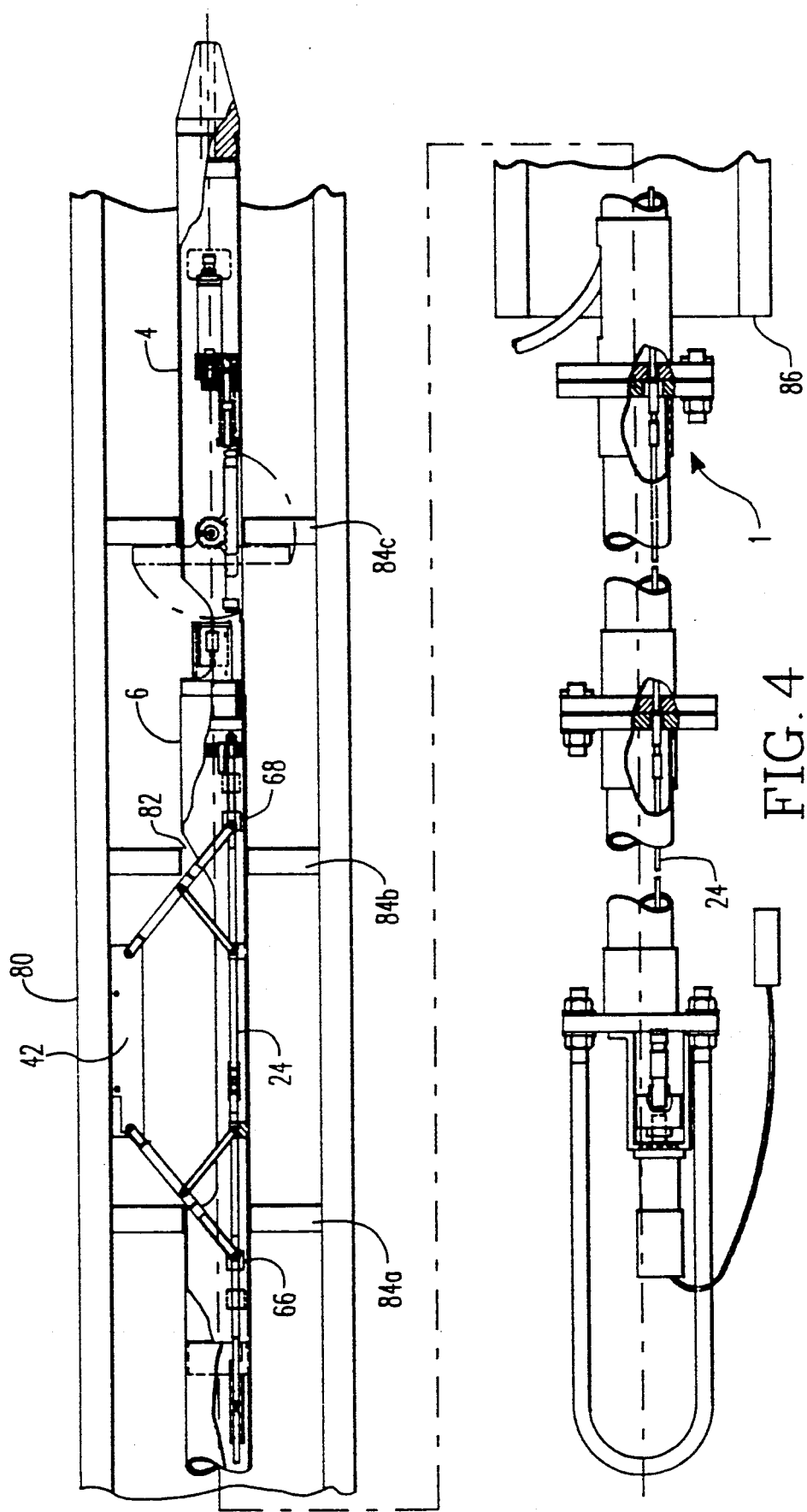
FIG. 4 is a cross-sectional view of the delivery tool positioned within a control rod guide tube.

Turning now to FIG. 4, the operation of the control rod guide tube inspection system will be described in detail. Before the delivery tool 1 is inserted into the guide tube 80, an ultrasonic thickness gauge which is mounted on the camera 43 is calibrated to a known distance, and the camera 43 is focused on a hole of known diameter. This is performed using a single calibration standard so as to ensure that the data collected by the camera 43 and transmitted to the image enhancement system is properly correlated. The image enhancement system is also calibrated to the known diameter. Once the calibration of the delivery tool 1 has been completed, the delivery tool may be inserted into control rod guide tube 80 through the central bore 82 formed in each of the guide plates 84. The delivery tool is inserted into the guide tube until a mark on the outside of the tool lines up with the rim portion 86 of the guide tube 80. Once this position has been reached the hydraulic cylinder 48 is activated so as to pivot the positioning foot 44 outwardly as explained previously, such that the delivery tool 1 may rest upon the upper surface of guide plate 84c which is that guide plate directly below the guide plate to be inspected. The positioning foot 44 includes rollers 88 which allow the delivery tool to be rotated once in contact with the guide plate 84c, and also these rollers will snap into radial slots formed in the guide plate between the array of through holes. Because the positioning foot 44 is aligned with the camera 43, it will be ensured that the camera 43 will be aligned with the through holes formed in the guide plate 84b.

Once the delivery tool has been properly positioned within the guide tube, the camera 43 is extended from the housing by the 24 VDC electric motor 26 which is mounted to the top flange 32 of the tool. This motor rotates the shaft 24 which extends downwardly through the inside of the delivery tool to the subassembly 6 which accommodates the camera 43. By rotating shaft 24, the nuts 66 and 68 will move either toward or away from one another to position the camera support 42 and camera 43 in alignment with one of the through holes formed in the guide plate 84b. It should be noted that the movement of the nuts 66 and 68 toward and away from one another will result in the linear movement of the camera 43 toward and away from the housing 2. Once sufficient data has been received from the initial through holes, the delivery tool may be rotated so as to position the camera over other through holes formed in the guide plate 84b. This allows virtually all of the guide plate holes to be inspected so as to provide sufficient data for developing a model of the wear characteristics.

Once all of the holes of a given guide plate have been inspected the camera will be fully retracted into the subassembly 6 and the pivotal member 44 fully retracted into subassembly 4 as discussed above, such that the delivery tool may be further inserted into the guide tube or retracted from the guide tube to position the camera over yet another guide plate. Multiple repetitions of the above procedure will allow each of the guide plates positioned within the control rod guide tube to be inspected.

We claim:

1. A control rod guide tube inspection tool for inspecting wear of through holes in guide plates within the guide tube comprising:
    an elongated cylindrical housing capable of extending into the control rod guide tube;
    positioning means extendible from said housing for positioning said tool within the control rod guide tube, said positioning means including a foot having a length greater than a diameter of said housing, said foot being pivotal about an axis substantially perpendicular to a central axis of said housing; and
    an inspection means for inspecting said through holes of said guide plates within the control rod guide tube.

2. The inspection tool as defined in claim 1, wherein said housing is a hollow cylindrical tube having a diameter less than that of a diameter of a central through hole in each of said guide plates.

3. The inspection tool as defined in claim 1, further comprising means for extending said positioning means from said housing.

4. The inspections tool as defined in claim 1, wherein said foot includes a spur gear mounted coaxial with said pivotal axis, and said means for extending said positioning means includes a slidable rack which mates with said spur gear to selectively extend and retract said foot.

5. The inspection tool as defined in claim 4, further including a hydraulic cylinder mounted in said housing having a piston rod connected to said slidable rack for sliding said rack.

6. The inspection tool as defined in claim 1, further comprising an extension means for laterally extending and retracting said inspection means from and into said housing.

7. The inspection tool as defined in claim 6, wherein said inspection means is a camera mounted in a camera support.

8. The inspection tool as defined in claim 7, wherein said extension means comprises a pair of straight line linkages, each including a first arm pivotally mounted at a first end to said camera support and pivotally mounted at a second end to a slidable element, and a second arm pivotally mounted at a first end to said first arm and pivotally mounted at a second end to said housing, so that movement of said sliding element in the direction of said elongated housing causes said camera and camera support to move essentially laterally relative to said direction of said housing.

9. The inspection tool as defined in claim 8, further comprising a rotatable shaft extending essentially the entire length of said housing having a lower threaded portion, wherein said slidable elements are oppositely threaded nuts threaded onto said lower threaded portion such that rotation of said shaft causes said nuts to move towards and away from one another thereby selectively extending and retracting said camera and camera support.

10. The inspection tool as defined in claim 7, wherein said camera further includes an ultrasonic thickness gauge for verifying the distance between said camera and said guide plate to be inspected.

11. A control rod guide tube inspection tool for inspecting wear of radially spaced through holes in guide plates mounted within the guide tube comprising:
    an elongated cylindrical housing capable of being extended into the control rod guide tube;
    positioning means for positioning said tool within the control rod guide tube, said positioning means including a foot having a length greater than a diameter of said housing, said foot being pivotal about an axis substantially perpendicular to a central axis of said housing;
    means for extending said positioning means from said housing; and
    an inspection means for inspecting said through holes of said guide plate within the guide tube.

12. The inspection tool as defined in claim 11, wherein said housing is a hollow cylindrical tube having a diameter less than that of a diameter of a central through hole in each of said guide plates.

13. The inspections tool as defined in claim 11, wherein said foot includes a spur gear mounted coaxial with said pivotal axis, and said means for extending said positioning means includes a slidable rack which mates with said spur gear to selectively extend and retract said foot.

14. The inspection tool as defined in claim 13, further including a hydraulic cylinder mounted in said housing having a piston rod connected to said slidable rack for sliding said rack.

15. The inspections tool as defined in claim 12, wherein said guide plates include slots radially extending between each of said through holes, and said foot includes a pair of rollers, one on each extremity of said foot to allow said housing to be rotated, and to mate with said slots to accurately position said inspection means.

16. The inspection tool as defined in claim 11, further comprising an extension means for laterally extending and retracting said inspection means from and into said housing.

17. The inspection tool as defined in claim 16, wherein said inspection means is a camera mounted in a camera support.

18. The inspection tool as defined in claim 17, wherein said extension means comprises a pair of straight line linkages, each including a first arm pivotally mounted at a first end to said camera support and pivotally mounted at a second end to a slidable element, and a second arm pivotally mounted at a first end to said first arm and pivotally mounted at a second end to said housing, so that movement of said sliding element in the direction of said elongated housing causes said camera and camera support to move essentially laterally relative to said direction of said housing.

19. The inspection tool as defined in claim 18, further comprising a rotatable shaft extending essentially the entire length of said housing having a lower threaded portion, wherein said slidable elements are oppositely threaded nuts threaded onto said lower threaded portion such that rotation of said shaft causes said nuts to move towards and away from one another thereby selectively extending and retracting said camera and camera support.

20. The inspection tool as defined in claim 19, wherein said camera further includes an ultrasonic thickness gauge for verifying the distance between said camera and said guide plate to be inspected.

21. A control rod guide tube inspection tool for inspecting wear of radially spaced through holes in guide plates mounted in said guide tube comprising;
    an elongated cylindrical housing capable of extending into the control rod guide tube;
    an inspection means for inspecting said through holes of said guide plates within the control rod guide tube; and
    an extension means for laterally extending and retracting said inspection means away from and into said housing.

22. The inspection tool as defined in claim 21, wherein said inspection means is a camera mounted in a camera support.

23. The inspection tool as defined in claim 22, wherein said extension means comprises a pair of straight line linkages, each including a first arm pivotally mounted at a first end to said camera support and pivotally mounted at a second end to a slidable element, and a second arm pivotally mounted at a first end to said first arm and pivotally mounted at a second end to said housing, so that movement of said sliding element in the direction of said elongated housing causes said camera and camera support to move essentially laterally relative to said direction of said housing.

24. The inspection tool as defined in claim 23, further comprising a rotatable shaft extending essentially the entire length of said housing having a lower threaded portion, wherein said slidable elements are oppositely threaded nuts threaded onto said lower threaded portion such that rotation of said shaft causes said nut to move towards and away from one another thereby selectively extending and retracting said camera and camera support.

25. The inspection tool as defined in claim 24, wherein said camera further includes an ultrasonic thickness gauge for verifying the distance between said camera and said guide plate to be inspected.

26. The inspection tool as defined in claim 21, wherein said housing is a hollow cylindrical tube having a diameter less than that of a diameter of a central through hole in each of said guide plates.

27. The inspection tool as defined in claim 21, further comprising means for extending said positioning means from said housing.

28. The inspection tool as defined in claim 27, wherein-said positioning means comprises a foot having a length greater than a diameter of said housing and is pivotal about an axis essentially perpendicular to a central axis of said housing.

29. The inspections tool as defined in claim 28, wherein said foot includes a spur gear mounted coaxial with said pivotal axis, and said means for extending said positioning means includes a slidable rack which mates with said spur gear to selectively extend and retract said foot.

30. The inspection tool as defined in claim 29, further including a hydraulic cylinder mounted in said housing having a piston rod connected to said slidable rack for sliding said rack.

31. A control rod guide tube inspection tool for inspecting wear of through holes in guide plates mounted within the guide tube comprising;
    an elongated cylindrical housing having a central axis and a diameter less than that of a diameter of a central through hole in each of said guide plates;
    a pivotal foot having a length greater than the diameter of said housing and pivotal about an axis perpendicular to the central axis of said housing for positioning said tool within the control rod guide tube;
    a hydraulic cylinder mounted in said housing for pivoting said foot between an inactive position essentially parallel to said central axis and an active position essentially perpendicular to said central axis;
    a camera mounted in a camera support for inspecting said through holes of the guide plates within the control rod guide tube; and
    a pair of straight line linkages, each including a first arm pivotally mounted at a first end to said camera support and pivotally mounted at a second end to a slidable element, and a second arm pivotally mounted at a first end to said first arm and pivotally mounted at a second end to said housing;
    wherein movement of said sliding elements in a direction parallel to said central axis causes said camera and camera support to move in a direction essentially perpendicular to said central axis.

32. The inspections tool as defined in claim 31, wherein said foot includes a spur gear mounted coaxial withs said pivotal axis and said means for extending said positioning means includes a slidable rack which mates with said spur gear to selectively extend and retract said foot.

33. The inspection tool as defined in claim 31, further comprising a rotatable shaft extending essentially the entire length of said housing having a lower threaded portion, wherein said slidable elements are oppositely threaded nuts threaded onto said lower threaded portion such that rotation of said shaft causes said nuts to move towards and away from one another thereby selectively extending and retracting said camera and camera support.

34. The inspection tool as defined in claim 31, wherein said camera further includes an ultrasonic thickness gauge for verifying the distance between said camera and said guide plate to be inspected.

* * * * *